United States Patent
Haza et al.

(10) Patent No.: US 11,751,230 B2
(45) Date of Patent: Sep. 5, 2023

(54) MODIFICATION OF INPUT SIGNALS AT LEAST WITH WEIGHTS TO CREATE A DESIRED ERROR VECTOR MAGNITUDE OR CLIPPING NOISE DISTRIBUTION FOR TRANSMISSION

(71) Applicant: Nokia Solutions and Networks Oy, Espoo (FI)

(72) Inventors: Grzegorz Haza, Wroclaw (PL); Vesa Häyrynen, Oulu (FI); Radoslaw Ceszkiel, Wroclaw (PL)

(73) Assignee: Nokia Solutions and Networks Oy, Espoo (FI)

( * ) Notice: Subject to any disclaimer, the term of this patent is extended or adjusted under 35 U.S.C. 154(b) by 20 days.

(21) Appl. No.: 17/203,386

(22) Filed: Mar. 16, 2021

(65) Prior Publication Data

US 2021/0298027 A1    Sep. 23, 2021

(30) Foreign Application Priority Data

Mar. 18, 2020 (FI) ...................................... 20205278

(51) Int. Cl.
*H04W 4/80* (2018.01)
*H04W 72/53* (2023.01)
(Continued)

(52) U.S. Cl.
CPC ......... *H04W 72/53* (2023.01); *H04L 27/2607* (2013.01); *H04L 27/2623* (2013.01);
(Continued)

(58) Field of Classification Search
CPC ............... H04W 72/0493; H04W 4/80; H04W 72/0446; H04W 72/0453; H04L 27/2607;
(Continued)

(56) References Cited

U.S. PATENT DOCUMENTS 7,944,991 B2      5/2011  Zhao et al.
10,425,266 B2 *   9/2019  Traverso ............. H04L 27/2614
(Continued)

FOREIGN PATENT DOCUMENTS

ES       2843826 T3 *   7/2021  ......... H04L 27/2604
WO    2019/231381 A1    12/2019

OTHER PUBLICATIONS

Office action received for corresponding Finnish Patent Application No. 20205278, dated Jan. 17, 2022, 3 pages.
(Continued)

*Primary Examiner* — Mounir Moutaouakil
(74) *Attorney, Agent, or Firm* — Harrington & Smith

(57) ABSTRACT

An apparatus, method and computer program is described comprising: receiving a first signal comprising one or more carrier signals comprising a plurality of resource blocks, wherein each resource block is assigned to a unique frequency and time slot of the respective carrier signal; generating a clipping pulse by modifying said first signal; converting the clipping pulse signal into a plurality of narrowband signals, wherein each narrowband signal is a frequency slice of the clipping pulse signal; modifying the plurality of narrowband signals to generate a plurality of modified narrowband signals, wherein said modifying is controlled based on filter weights that define a level of noise to be added to the respective narrowband signals in accordance with a desired error vector magnitude distribution or clipping noise distribution.

20 Claims, 11 Drawing Sheets

(51) Int. Cl.
  *H04L 27/26* (2006.01)
  *H04W 72/0446* (2023.01)
  *H04W 72/0453* (2023.01)
(52) U.S. Cl.
  CPC ......... *H04W 4/80* (2018.02); *H04W 72/0446* (2013.01); *H04W 72/0453* (2013.01)
(58) Field of Classification Search
  CPC .......... H04L 27/2623; H04L 27/26416; H04L 27/2624; H04L 27/2614; H04L 27/3411
  See application file for complete search history.

(56) References Cited

U.S. PATENT DOCUMENTS

| | | | |
|---|---|---|---|
| 10,951,450 B2* | 3/2021 | Valten | H04L 27/264 |
| 2012/0308029 A1 | 12/2012 | Christoph | |
| 2016/0191110 A1 | 6/2016 | Brecher et al. | |
| 2016/0277229 A1 | 9/2016 | Dick | |
| 2017/0264476 A1 | 9/2017 | Yang et al. | |
| 2021/0176107 A1* | 6/2021 | Hou | H04L 27/2624 |

OTHER PUBLICATIONS

Extended European Search Report received for corresponding European Patent Application No. 21162197.4, dated Aug. 16, 2021, 7 pages.

Chen et al., "Non-Maximally Decimated Analysis/Synthesis Filter Banks: Applications in Wideband Digital Filtering", IEEE Transactions on Signal Processing, vol. 62, No. 4, Feb. 15, 2014, pp. 852-867.

Li et al., "A Resource Block Based Filtered OFDM Scheme and Performance Comparison", ICT, May 6-8, 2013, 5 pages.

Office action received for corresponding Finnish Patent Application No. 20205278, dated Aug. 18, 2020, 9 pages.

Gokceli et al., "Frequency-Selective PAPR Reduction for OFDM", IEEE Transactions on Vehicular Technology, vol. 68, No. 6, Jun. 2019, pp. 6167-6171.

Rahmatallah et al., "Peak-To-Average Power Ratio Reduction in OFDM Systems: A Survey and Taxonomy", IEEE Communications Surveys & Tutorials, vol. 15, No. 4, 2013, pp. 1567-1592.

* cited by examiner

MODIFICATION OF INPUT SIGNALS AT LEAST WITH WEIGHTS TO CREATE A DESIRED ERROR VECTOR MAGNITUDE OR CLIPPING NOISE DISTRIBUTION FOR TRANSMISSION

RELATED APPLICATION

This application claims priority to Finnish Application No. 20205278, filed on Mar. 18, 2020, which is incorporated herein by reference in its entirety.

FIELD

The present specification relates to modification of signals for transmission, for example using a mobile communication system.

BACKGROUND

A number of algorithms by which signals for transmission can be modified to achieve effects such as reduced peak-to-average-power ratio are known. Such modification can be treated as additive signals (e.g. clipping noise). There remains a need for further developments in this field.

SUMMARY

In a first aspect, this specification describes an apparatus comprising means for performing: receiving a first signal, wherein the first signal comprises one or more carrier signals for transmission, each carrier signal comprising a plurality of resource blocks or resource elements, wherein each resource block or resource element is assigned to a unique frequency and time slot of the respective carrier signal; generating a second signal by modifying said first signal, wherein the second signal is a clipping pulse signal; converting the second signal into a plurality of narrowband signals, wherein each narrowband signal is a frequency slice of the second signal; modifying the plurality of narrowband signals to generate a plurality of modified narrowband signals, wherein said modifying is controlled based on filter weights that define a level of noise to be added to the respective narrowband signals in accordance with a desired error vector magnitude distribution or clipping noise distribution; combining the plurality of modified narrowband signals into a third signal; and generating a fourth signal suitable for transmission based on a combination of the first signal and third signal (e.g. such that the fourth signal has a lower peak to average power ratio than the first signal). The apparatus may further comprise means for performing: generating a delayed version of the first signals. The said fourth signal may be generated based on a combination of the delayed first signal and the third signals.

In some embodiments, the means for generating said second signal may be further configured to modify said first signal by adding local modifications to the fast signal when the amplitude of the first signal exceeds a threshold level.

Some embodiments further comprise: determining said desired error vector magnitude distribution or clipping noise distribution.

The means for performing modification of the plurality of narrowband signals may be configured to preferentially distribute said noise outside said carrier signals, such that said desired error vector magnitude or clipping noise distribution has a higher noise level outside some or all of said carrier signals than inside said carrier signals.

The means for performing modification of the plurality of narrowband signals may be configured to preferentially distribute said noise within guard bands of carrier signals, such that said desired error vector magnitude distribution or clipping noise distribution has a higher noise level within at least some guard bands of carrier signals than within inband portions of the corresponding carrier signals.

The means for performing modification of the plurality of narrowband signals may be configured to preferentially distribute said noise within resource blocks or resource elements not being used for transmission of data, such that said desired error vector magnitude distribution or clipping noise distribution has a lower noise level within some or all resource blocks or resource elements being used for transmission of data than within some or all resource blocks or resource elements of corresponding frequency slices that are not being used for transmission of data.

The means for performing modification of the plurality of narrowband signals may be configured to preferentially distribute said noise amongst said carriers, such that said desired error vector magnitude distribution or clipping noise distribution has a lower noise level for some carriers that other carriers.

The means for performing modification of the plurality of narrowband signals may be configured to preferentially distribute said noise amongst resource blocks or resource elements within at least some of said carriers, such that said desired error vector magnitude distribution or clipping noise distribution has a lower noise level for resource blocks or resource elements within a carrier than other resource blocks or resource elements within the same carrier.

In some example embodiments, the desired error vector magnitude distribution or clipping noise distribution has a lower noise level for at least some resource blocks or resource elements with a relatively high modulation order than other resource blocks or resource elements with a lower modulation order. Alternatively, or in addition, the desired error vector magnitude distribution or clipping noise distribution has a higher noise level for at least some resource blocks or resource elements with a lower code rate and/or with lower MIMO rank than resource blocks or resource elements having a higher code rate and/or with higher MIMO rank.

The means for performing modification of the plurality of narrowband signals may be configured to distribute said noise amongst resource blocks or resource elements of different frequency slices. The means for performing modification of the plurality of narrowband signals may be configured to distribute said noise amongst resource blocks or resource elements of different time slices, time slots or time periods. The means for performing modification of the plurality of narrowband signals may be configured to distribute said noise amongst resource blocks or resource elements within the same frequency slice. The means for performing modification of the plurality of narrowband signals may be configured to distribute said noise amongst resource blocks or resource elements within the same time slice, time slot or time period.

In some example embodiments, the first signal may comprise a plurality of carrier signals, each comprising a plurality of said resource blocks or resource elements.

The means for converting the second signal into a plurality of narrowband signals may comprise a plurality of narrowband filters.

The said means may comprise: at least one processor; and at least one memory including computer program code, the at least one memory and the computer program code configured, with the at least one processor, to cause the performance of the apparatus.

In a second aspect, this specification describes a method comprising: receiving a first signal, wherein the first signal comprises one or more carrier signals for transmission, each carrier signal comprising a plurality of resource blocks or resource elements, wherein each resource block or resource element is assigned to a unique frequency and time slot of the respective carrier signal; generating a second signal by modifying said first signal, wherein the second signal is a clipping pulse signal; converting the second signal into a plurality of narrowband signals, wherein each narrowband signal is a frequency slice of the second signal; modifying the plurality of narrowband signals to generate a plurality of modified narrowband signals, wherein said modifying is controlled based on filter weights that define a level of noise to be added to the respective narrowband signals in accordance with a desired error vector magnitude distribution or clipping noise distribution; combining the plurality of modified narrowband signals into a third signal; and generating a fourth signal suitable for transmission based on a combination of the first signal and the third signals (e.g. such that the fourth signal has a lower peak to average power ratio than the first signal). The method may further comprise: generating a delayed version of the first signal.

The said fourth signal may be generated based on a combination of the delayed first signal and the third signals.

In some example embodiments, generating said second signal may further comprise: modifying said first signal by adding local modifications to the first signal when the amplitude of the first signal exceeds a threshold level.

Some example embodiments further comprise: determining said desired error vector magnitude distribution or clipping noise distribution.

Modification of the plurality of narrowband signals may comprise preferentially distributing said noise outside said carrier signals, such that said desired error vector magnitude or clipping noise distribution has a higher noise level outside some or all of said carrier signals than inside said carrier signals.

Modification of the plurality of narrowband signals may comprise preferentially distributing said noise within guard bands of carrier signals, such that said desired error vector magnitude distribution or clipping noise distribution has a higher noise level within at least some guard bands of carrier signals than within inband portions of the corresponding carrier signals.

Modification of the plurality of narrowband signals may comprise preferentially distributing said noise within resource blocks or resource elements not being used for transmission of data, such that said desired error vector magnitude distribution or clipping noise distribution has a lower noise level within some or all resource blocks or resource elements being used for transmission of data than within some or all resource blocks or resource elements of corresponding frequency slices that are not being used for transmission of data.

Modification of the plurality of narrowband signals may comprise preferentially distributing said noise amongst said carriers, such that said desired error vector magnitude distribution or clipping noise distribution has a lower noise level for some carriers that other carriers.

Modification of the plurality of narrowband signals may comprise preferentially distributing said noise amongst resource blocks or resource elements within at least some of said carriers, such that said desired error vector magnitude distribution or clipping noise distribution has a lower noise level for resource blocks or resource elements within a carrier than other resource blocks or resource elements within the same carrier.

The desired error vector magnitude distribution or clipping noise distribution may have a lower noise level for at least some resource blocks or resource elements with a relatively high modulation order than other resource blocks or resource elements with a lower modulation order. Alternatively, or in addition, the desired error vector magnitude distribution or clipping noise distribution may have a higher noise level for at least some resource blocks or resource elements with a lower code rate and/or with lower MIMO rank than resource blocks or resource elements having a higher code rate and/or with higher MIMO rank.

Modification of the plurality of narrowband signals is configured to distribute said noise amongst at least one of: resource blocks or resource elements of different frequency slices; resource blocks or resource elements of different time slices, time slots or time periods; resource blocks or resource elements within the same frequency slice; and resource blocks or resource elements of within the same time slice, time slot or time period.

In some example embodiments, the first signal may comprise a plurality of carrier signals, each comprising a plurality of said resource blocks or resource elements.

The means for converting the second signal into a plurality of narrowband signals may comprise a plurality of narrowband filters.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: receiving a first signal, wherein the first signal comprises one or more carrier signals for transmission, each carrier signal comprising a plurality of resource blocks or resource elements, wherein each resource block or resource element is assigned to a unique frequency and time slot of the respective carrier signal; generating a second signal by modifying said first signal, wherein the second signal is a clipping pulse signal; converting the second signal into a plurality of narrowband signals, wherein each narrowband signal is a frequency slice of the second signal; modifying the plurality of narrowband signals to generate a plurality of modified narrowband signals, wherein said modifying is controlled based on filter weights that define a level of noise to be added to the respective narrowband signals in accordance with a desired error vector magnitude distribution or clipping noise distribution; combining the plurality of modified narrowband signals into a third signal; and generating a fourth signal suitable for transmission based on a combination of the first signal (or a delayed first signal) and the third signal (e.g. such that the fourth signal has a lower peak to average power ratio than the first signal).

In a ninth aspect, this specification describes a computer-readable medium (such as a non-transitory computer-readable medium) comprising program instructions stored thereon for performing at least the following: receiving a first signal, wherein the first signal comprises one or more carrier signals for transmission, each carrier signal comprising a plurality of resource blocks or resource elements, wherein each resource block or resource element is assigned to a unique frequency and time slot of the respective carrier signal; generating a second signal by modifying said first signal, wherein the second signal is a clipping pulse signal; converting the second signal into a plurality of narrowband signals, wherein each narrowband signal is a frequency slice of the second signal; modifying the plurality of narrowband signals to generate a plurality of modified narrowband signals, wherein said modifying is controlled based on filter weights that define a level of noise to be added to the respective narrowband signals in accordance with a desired error vector magnitude distribution or clipping noise distribution; combining the plurality of modified narrowband signals into a third signal; and generating a fourth signal suitable for transmission based on a combination of the first signal (or a delayed first signal) and the third signal (e.g. such that the fourth signal has a lower peak to average power ratio than the first signal).

In an eleventh aspect, this specification describes an apparatus comprising: at least one processor; and at least one memory including computer program code which, when executed by the at least one processor, causes the apparatus to: receive a first signal, wherein the fast signal comprises one or more carrier signals for transmission, each carrier signal comprising a plurality of resource blocks or resource elements, wherein each resource block or resource element is assigned to a unique frequency and time slot of the respective carrier signal; generate a second signal by modifying said first signal, wherein the second signal is a clipping pulse signal; convert the second signal into a plurality of narrowband signals, wherein each narrowband signal is a frequency slice of the second signal; modify the plurality of narrowband signals to generate a plurality of modified narrowband signals, wherein said modifying is controlled based on filter weights that define a level of noise to be added to the respective narrowband signals in accordance with a desired error vector magnitude distribution or clipping noise distribution; combine the plurality of modified narrowband signals into a third signal; and generate a fourth signal suitable for transmission based on a combination of the first signal (or a delayed first signal) and the third signal (e.g. such that the fourth signal has a lower peak to average power ratio than the first signal).

In a thirteenth aspect, this specification describes an apparatus comprising: means (such as a preview module of a sampling module) for receiving a first signal, wherein the first signal comprises one or more carrier signals for transmission, each carrier signal comprising a plurality of resource blocks or resource elements, wherein each resource block or resource element is assigned to a unique frequency and time slot of the respective carrier signal; means (such as a clipping pulse generation module) for generating a second signal by modifying said first signal, wherein the second signal is a clipping pulse signal; means (such as filter module) for converting the second signal into a plurality of narrowband signals, wherein each narrowband signal is a frequency slice of the second signal; means (such as a plurality of weighted multipliers) for modifying the plurality of narrowband signals to generate a plurality of modified narrowband signals, wherein said modifying is controlled based on filter weights that define a level of noise to be added to the respective narrowband signals in accordance with a desired error vector magnitude distribution or clipping noise distribution; means (such as a synthesis module) for combining the plurality of modified narrowband signals into a third signal; and means (such as a summing module) generating a fourth signal suitable for transmission based on a combination of the first signal (or a delayed first signal) and the third signal (e.g. such that the fourth signal has a lower peak to average power ratio than the first signal).

BRIEF DESCRIPTION OF THE DRAWINGS

Example embodiments will now be described, by way of example only, with reference to the following schematic drawings, in which.

DETAILED DESCRIPTION

Figure 1:
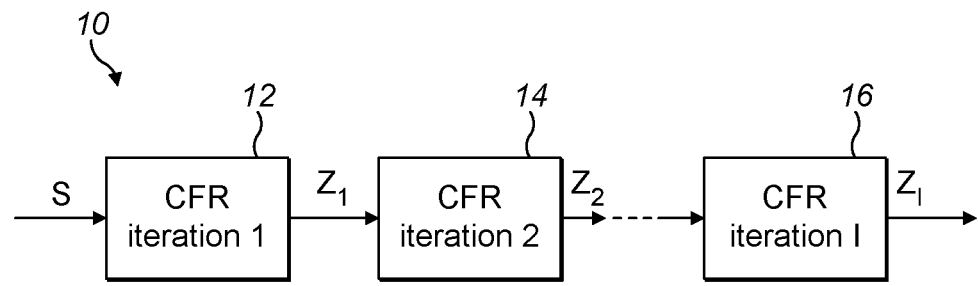
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

In the current long term evolution (LTE) and 5G new radio (NR) technology communication systems, higher order modulations such as 256-QAM and 1024-QAM may be used. Higher order modulations typically require higher levels of signal to noise ratio (SNR) than lower order modulations. Therefore, the contribution of noise from a base station supporting higher order modulations may need to be reduced.

A significant contributor of noise in many base station downlink paths is the use of a Crest Factor Reduction (CFR) algorithm, implemented, for example, in a Digital Front End (DFE) of a radio unit. The CFR algorithm may be used to reduce Peak to Average Ratio (PAR) or Peak to Average Power Ratio (PAPR) of a signal by introducing local modifications to the signal whenever the signal amplitude exceeds specified threshold. Such modifications can be treated as an additive signal (often referred to as clipping noise) generated by the CFR algorithm and incorporated into the processed signal. The level of distortion introduced to the signal can be measured at the output of the base station and quantified as Error Vector Magnitude (EVM).

CFR may be an iterative procedure which gradually reduces the peak to average ratio (PAR) or peak to average power ratio (PAPR) of a processed signal. By way of example, FIG. 1 is a block diagram of a system, indicated generally by the reference numeral 10, in accordance with an example embodiment. The system 10 shows a first CFR iteration 12, a second CFR iteration 14 and an $I^{th}$ CFR iteration 16. The system 10 shows an example processing chain with a wideband input signal S and a plurality of clipped signals $Z_1, Z_2, \ldots, Z_I$ output by the CFR iterations 12, 14 and 16 respectively. Of course, the CFR iterations may be implemented by separate CFR modules or could be implemented by a single CFR module.

Figure 2:
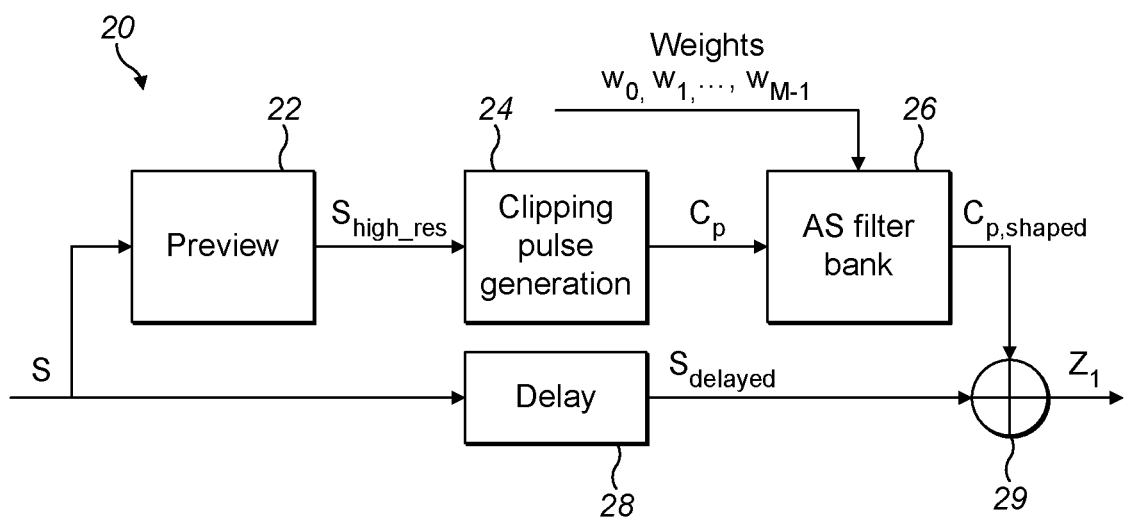
FIG. 2 is a block diagram of a system in accordance with an example embodiment.

FIG. 2 is a block diagram of a system, indicated generally by the reference numeral 20, in accordance with an example embodiment. The system 20 shows a single iteration of a simplified wideband CFR algorithm and may therefore be used to implement each of the CFR iterations 12, 14 and 16 of the system 10.

The system 20 comprises a preview module 22, a clipping pulse generation module 24, a filter bank 26, a delay module 28 and a summing module 29.

An input composite wideband signal S is received and provided to the input of the preview module 22. The preview module 22 samples the signal S and may perform oversampling, for example to meet clipping accuracy requirements. As shown in FIG. 2, the preview module 22 provides the sampled signal $S_{high\_res}$ to the input of the clipping pulse generation module 24. The sampled signal $S_{high\_res}$ may have a higher resolution in time than the input signal S. For example, the signal $S_{high\_res}$ may be sampled with a U-times (perhaps 2, 4 or 8 times) higher sample rate (UxSR) compared to the input signal S, sampled with the sample rate SR.

The clipping pulse generation module 24 is configured to generate an unfiltered clipping pulse signal $C_p$, thereby implementing a CFR algorithm. The unfiltered clipping pulse signal $C_p$ is provided to the input of the filter bank 26. The filter bank 26 provides a shaped version of the pulse signal $C_{p,shaped}$. As discussed in detail below, the shaping implemented by the filter bank 26 may adjust the EVM of the filtered signal, when compared with the unfiltered output of the clipping pulse generation module 24.

The delay module 28 is responsible for delaying input composite wideband signal S and to produce a delayed version $S_{delayed}$ which is time aligned with the shaped version of the pulse signal $C_{p,shaped}$.

The summing module 29 is configured to sum the clipping pulse signal after pulse shaping $C_{p,shaped}$ and the delayed input signal $S_{delayed}$ to generate the output signal $Z_1$.

As noted above, the system 20 may be used to implement each of the CFR iterations 12, 14 and 16 of the system 10. Thus, for the second iteration 14, the signal $Z_1$ may be input to the preview module 22 and the signal $Z_2$ output by the summing module 29.

Figure 3:
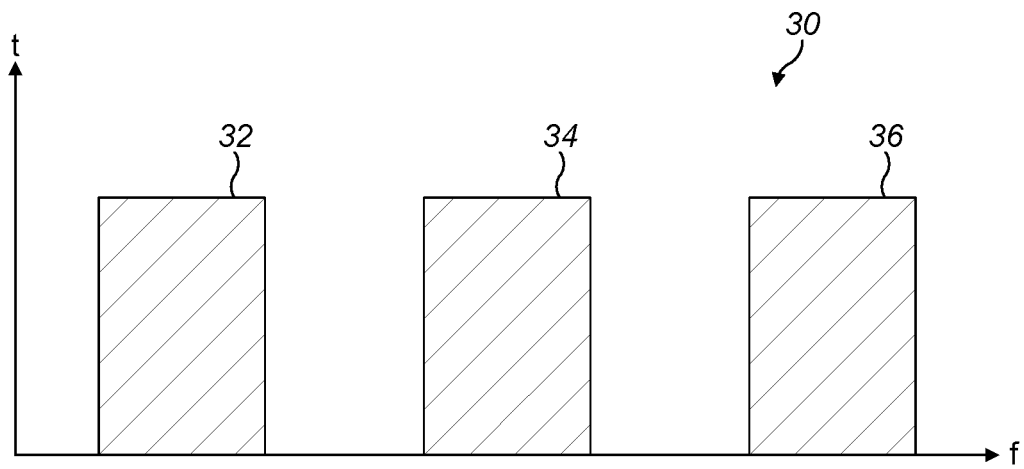
FIG. 3 is a plot showing an example wideband input signal in accordance with an example embodiment.

FIG. 3 is a plot, indicated generally by the reference numeral 30, showing an example wideband input signal S in accordance with an example embodiment. The plot shows frequency plotted against time and shows that the wideband input signal plot S comprises a first carrier 32, a second carrier 34 and a third carrier 36, with each of the carriers being provided at a different frequency range and each carrier being for transmission using a communication system. Typically, each of the carriers includes a plurality of resource blocks or resource elements (as discussed further below), wherein each resource block or element is assigned to a unique frequency and time slot of the respective carrier signal.

Generally, a resource block (RB) consists of a set of resource elements (RE) in the time and frequency domain. Each resource element can, for example, be a single subcarrier of an OFDM symbol in the frequency domain and/or one OFDM symbol in the time domain. A resource element can also refer to an atomic element of an LTE or NR frame. References to resource blocks herein generally refer to either resource elements or resource blocks.

As described in detail below, the impact of clipping noise can be reduced by balancing clipping noise between carriers and/or balancing clipping noise inside of carriers (e.g. between resource blocks (RBs) resource elements (REs) or groups of RBs or groups of REs). This balancing may be implemented by the filter bank 26.

Clipping noise balancing may be carried out between carriers. For example, if some of the carriers (such as some of the carriers 32, 34 and 36) are using lower order modulations (which can cope with higher EVM levels) and others of the carriers are using higher order modulation, one can achieve lower EVM in the carriers transmitting higher order modulation symbols without increasing the overall PAR or PAPR of the signal. Thus, EVM can be distributed between carriers to reduce the impact of the clipping noise (e.g. such that neither the range of the base station nor the power consumption is adversely affected). Similarly, clipping noise may be balanced such that resource blocks having a lower code rate and/or with lower MIMO rank have a higher noise level than resource blocks having a higher code rate and/or with higher MIMO rank.

Alternatively, or in addition, clipping noise balancing may be carried out within the carriers. Such balancing may enable accurate adjustment of the clipping noise according to a given Modulation Coding Scheme (MCS) inside of the resources blocks within the carrier. This option may extend the concept of clipping noise balancing between the carriers to more precise tuning also inside of the carrier according to assigned MCS inside of resource blocks (RBs) of a group of RBs. MCS is an example of a parameter that may have an impact on clipping noise balance. MIMO rank is an example of another potentially relevant parameter.

Two approaches for clipping noise balancing inside of carriers are static and dynamic clipping noise allocation. If static clipping noise allocation is applied, then some resource blocks receive the EVM levels which are either above or below the maximum level required for the requested MCS. Dynamic clipping noise allocation can be applied to a given resource block or group of resource blocks both in frequency and in time domain.

As noted above, higher order modulations typically require higher signal to noise ratios (SNR) than lower order modulations. Therefore, the contribution of noise from a base station supporting higher order modulations may need to be reduced (compared with a base station supporting only lower order modulations). Thus, a maximum EVM level may be variable depending on the modulation scheme. In one example embodiment, maximum EVM levels were set as follows:

For 16-QAM, the maximum EVM was set at 12%
For 64-QAM, the maximum EVM was set at 7%
For 256-QAM, the maximum EVM was set at 2%

Of course, other maximum EVM levels could be set. Moreover, for simplification of presentation, only a limited amount of modulation schemes are described in the examples presented herein. Other modulation schemes (e.g. QPSK, 1024-QAM etc.) could be used.

Figure 4:
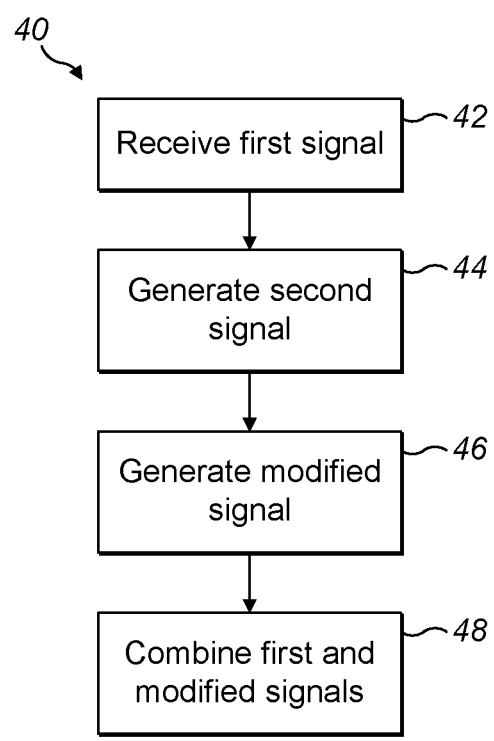
FIG. 4 is a flow chart showing an algorithm in accordance with an example embodiment.

FIG. 4 is a flow chart showing an algorithm, indicated generally by the reference numeral 40, in accordance with an example embodiment. The algorithm 40 may be implemented using the system 20 described above.

The algorithm 40 starts at operation 42, where a first signal (such as the wideband signal S) is received. As described in detail below, the first signal may comprise one or more carrier signals (such as the carrier signals 32, 34 and 36) for transmission using a communication system (such as a mobile communication system), with each carrier signal comprising a plurality of resource blocks, each resource block being assigned to a unique frequency and time slot of the respective carrier signal.

At operation 44, a second signal (such as the signal $C_p$) is generated based on the first signal. The second signal may be generated by the clipping pulse generation module 24 by modifying the signal output by the preview module 22, such that the second pulse is an unfiltered clipping pulse signal.

At operation 46, a modified signal (such as the signal $C_{p,shaped}$) is generated based on the second signal. Thus, the modified signal is a filtered or shaped version of the second signal. An example implementation of the operation 46 is described in detail below.

Finally, at operation 48, the first signal and the modified signal are combined (e.g. with suitable delays) to generate a signal suitable for transmission using the communication system. For example, the delayed first signal and the modified signal may be summed to obtain the output Z, such that the combined signal has a lower peak to average ratio (PAR) or peak to average power ratio (PAPR) than the first signal.

As discussed above, the CFR process may be iterative such that the output of the operation 48 may be provided as the input to a further iteration of the algorithm 40. The algorithm 40 may be repeated a set number of times. Alternatively, or in addition, the algorithm 40 may be repeated until a performance metric is reached.

The implementation of the filter bank 26 can be difficult for a number of reasons. For example, in order for the system to be dynamic (e.g. to enable EVM distribution or clipping noise balancing to be adjusted), filter coefficients may need to be updated on-the-fly. Not only can this be computationally complex, but the reconfiguration of filter coefficients may lead to spectral degradation of the filtered signal if, for example, in an implementation using an FIR filter, switching to new coefficients causes a signal filtered with old coefficients to be cut immediately.

The block 26, instead of being based on an AS filter bank, may be implemented using an FIR filter; however, FIR filtering in time and frequency domains needs a new sets of coefficients to be designed for a new (and different) configuration of clipping noise distribution in a dynamic mode of operation. FIR filters both in time and frequency domains need additional modification to ensure that an old impulse response (for old weights) and a new impulse response (for new weights) will not be cut. If the old or new impulse response is cut, then it can lead to spectral degradation (as mentioned above).

Figure 5:
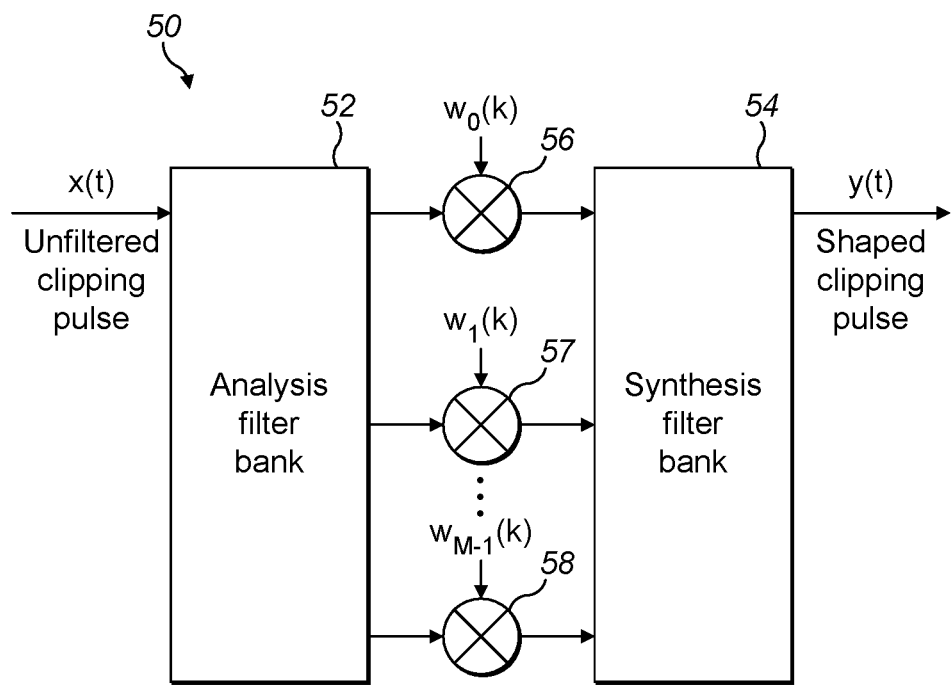
FIG. 5 is a block diagram of a system in accordance with an example embodiment.

FIG. 5 is a block diagram of a system, indicated generally by the reference numeral 50, in accordance with an example embodiment. The system 50 is an example implementation of the filter bank 26 may be configured to implement the operation 46 of the algorithm 40 described above.

The system 50 comprises an analysis filter bank 52, a synthesis filter bank 54, a first multiplier 56, a second multiplier 57 and a M-th multiplier 58. The system 50 comprises M number of multipliers. The multipliers each have weights, which weights may be adjusted to adjust the functionality of the system 50. Thus, as shown in FIG. 5, the first multiplier 56 receives weight $w_0(k)$, the second multiplier 57 receives weight $w_1(k)$ and the M-th multiplier 58 receives weight $w_{M-1}(k)$.

As described in detail below, the system 50 forms an analysis-synthesis filter bank (AS FB) for shaping in frequency the clipping noise produced by a Crest Factor Reduction algorithm (CFR). In the analysis-synthesis filter bank, reconfiguration of frequency response is handled by a set of real valued or complex weights. This approach can be used to enable fast and simple reconfiguration of the frequency response of the system to enable suitable shaping of clipping noise.

Thus, for example, the system 50 can readily be adjusted to switch from a first set of coefficients (e.g. $w_0(k-1)$, $w_1(k-1), \ldots w_{M-1}(k-1)$) to a second set of coefficients (e.g. $w_0(k), w_1(k), \ldots, w_{M-1}(k)$), where k indicates the number of a sample.

Figure 6:
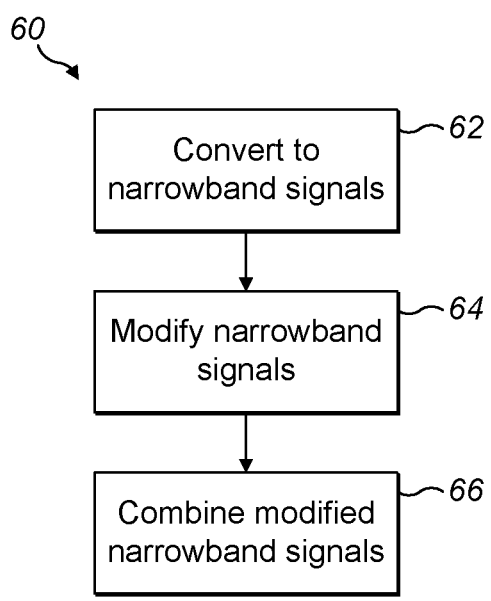
FIG. 6 is a flow chart showing an algorithm in accordance with an example embodiment.

FIG. 6 is a flow chart showing an algorithm, indicated generally by the reference numeral 60, in accordance with an example embodiment. The algorithm 60 is an example implementation of the operation 46 described above (and may be implemented by the system 50).

The algorithm 60 receives a signal (such as the output of the clipping pulse generation module 24 described above).

At operation 62, the received signal is converted into a plurality of narrowband signals, wherein each narrowband signal is a frequency slice of the received signal. Each of the narrowband signals may have a bandwidth narrower (often significantly narrower) than the frequency slot of a relevant resource block of a carrier of a received wideband signal.

The operation 62 may be implemented using a predefined analysis filter (e.g. the analysis filter bank 52 described above). For example, the analysis filter bank 52 may receive a signal x(t), such as a clipped pulse (e.g. the output of the module 24 described above) and the analysis filter bank 52 may convert the signal x(t) into a plurality of narrowband signals (each narrowband signal being a frequency slice of the signal x(t)).

At operation 64, the plurality of narrowband signals generated in the operation 62 are modified to generate a plurality of modified narrowband signals, wherein said modifying is controlled based on filter weights that define a level of noise to be added to the respective narrowband signals in accordance with a desired error vector magnitude distribution or clipping noise distribution.

The operation 64 may be implemented by the multipliers 56 to 58 (with suitable weights). For example, a first of the narrowband signals generated by the analysis filter bank 52 may be provided as an input to the first multiplier 56. Similarly a second narrowband single may be provided as an input to the second multiplier 57 and an $M^{th}$ narrowband signal is provided as an input to the $M^{th}$ multiplier 58. Of course, three multipliers are shown in the system 50 by way of example only; any number of multipliers could be provided.

At operation 66, the plurality of modified narrowband signals are combined into a third signal. The third signal may be based on the second signal and said noise. The third signal contains the frequency-shaped (weighted) additive clipping noise suitable for adding to the delayed first signal.

The operation 66 may be implemented using a predefined synthesis filter (e.g. the synthesis filter bank 54 described above).

Figure 7:
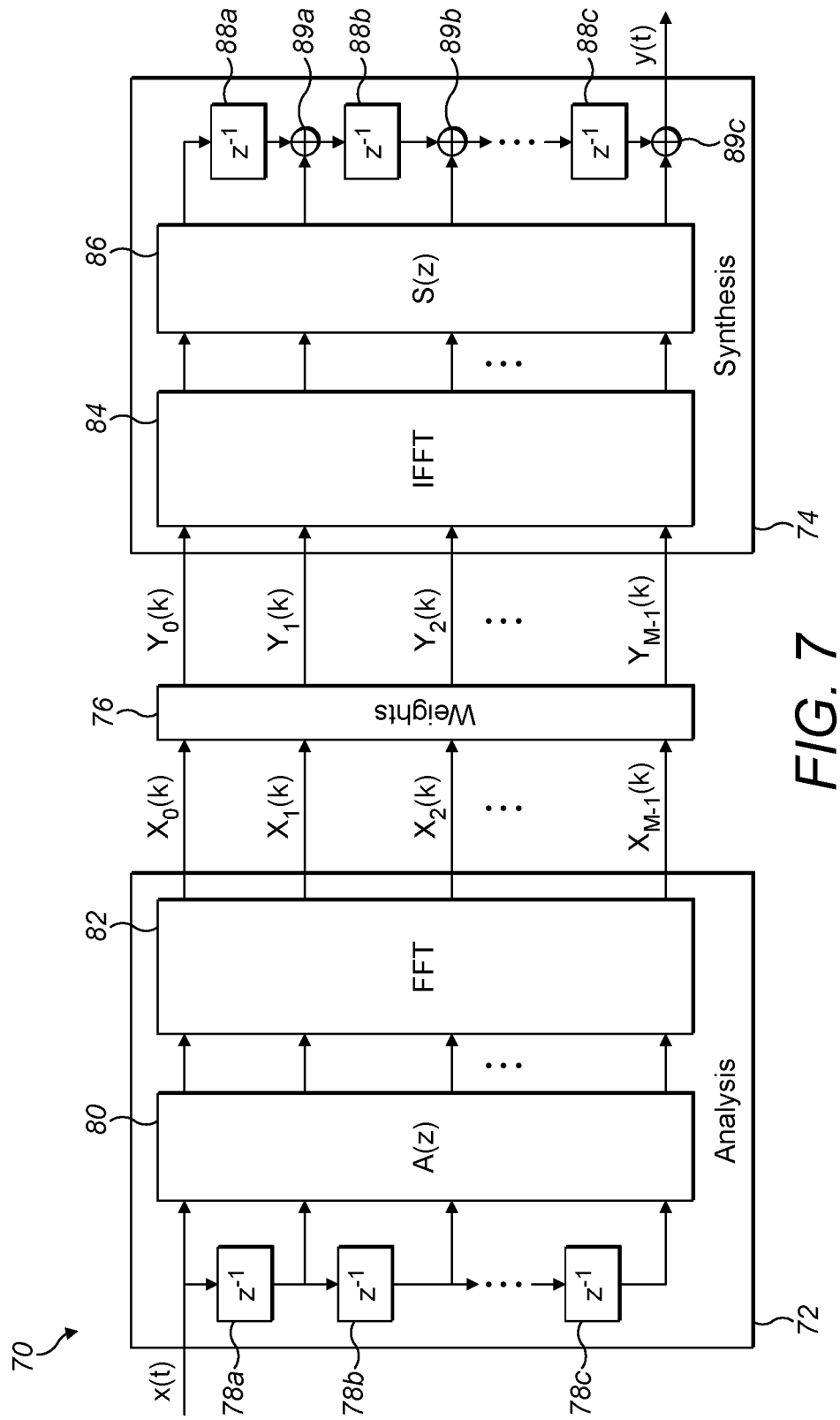
FIG. 7 is a block diagram of a system in accordance with an example embodiment.

FIG. 7 is a block diagram of a system, indicated generally by the reference numeral 70, in accordance with an example embodiment. The system 70 shows details of an example implementation of the system 50 described above. The system 70 includes an analysis filter bank 72 (similar to the analysis filter bank 52 described above), a synthesis filter bank 74 (similar to the synthesis filter 54 described above) and a weighting module 76 (similar to the first multiplier 56, the second multiplier 57 and the $M^{th}$ multiplier 58 described above).

The analysis filter bank 72 comprises a plurality of delay stages (a first delay stage 78a, a second delay stage 78b and $M^{th}$ delay stage 78c are shown in FIG. 7 by way of example), a filter block 80 and an FFT block 82. Similarly, the synthesis filter bank 74 comprises an inverse FFT block 84, a filter block 86, a plurality of delay stages (a first delay stage 88a, a second delay stage 88b and a $M^{th}$ delay stage 88c are shown in FIG. 7 by way of example) and a plurality of summing modules (a first summing module 89a, a second summing module 89b and a $M^{th}$ summing module 89c are shown in FIG. 7 by way of example).

The filter block 80 may be implemented using: M parallel branches where each branch consists of serially connected downsampling step with a factor M and a polyphase filter. Similarly, the filter block 86 may be implemented using: M parallel branches where each branch consists of serially connected polyphase filter and an upsampling step with a factor M.

The systems 50 and 70 enable dynamic balancing of clipping noise between resource blocks to be provided. Moreover, with this functionality it is possible to distribute the clipping noise from crest factor reduction between subcarriers according to a given spectral EVM profile. By reconfiguration of the filter weights (e.g. the weights of the multipliers 56 to 58), some resource blocks can have lower EVM (therefore, for example, enabling those resource blocks to be modulated using higher order modulations such as 256-QAM or 1024-QAM) at the cost of increasing EVM in other resources blocks (for example, limiting those resource blocks to transmitting only lower order modulations, such as 16-QAM or QPSK). The desired clipping noise allocation is set by configuring the analysis-synthesis filter weights $w_0(k), \ldots, w_{M-1}(k)$. With this approach, different strategies for clipping noise allocation may be provided by simply adjusting the weights.

Moreover, if some resource blocks are not used for transmission, they can be used more effectively for clipping noise allocation. Consequently, the clipping noise can be further reduced in the resource blocks that are actually used for transmission.

The structure of the systems 50 and 70 are such that when the weights are changed, no additional steps are required to obtain proper frequency response of the system. There is also no need to smooth the transition when changing the weights to avoid spectrum widening. Thus, time and spectral properties are maintained by the bank of analysis and synthesis filters. The analysis-synthesis filters are time constant and they need not changed during operating in the dynamic mode.

The fact that the coefficients of the analysis filters and the synthesis filters described above do not need to change during operation can address a number of time domain and frequency domain problems that can occurs when using FIR filtering.

The analysis filter banks 52 and 72 may comprise a plurality of narrowband filters. Those narrowband filters may be predefined (e.g. pre-calculated offline), such that they do not need to be configured on the fly. Similarly, the filters of the synthesis filter bank 54 and 74 may be predefined (e.g. pre-calculated offline). By pre-calculating filter settings, calculation power of a Digital Front End (DFE) of a radio unit are not required to be consumed with such calculations. Therefore, a configuration can be changed and applied more quickly (when compared with FIR filters) by making simple changes to weights of the weighting module 76.

Thus, the analysis filter 80 can be used to split the input signal for very narrow M frequency slices. Then, we may divide each slice by the factor of M, so the sampling rate is SR/M compared to sample rate SR of the signal at the input.

So, after the analysis filter 80 we have M parallel branches. Each branch has a signal with sampling frequency SR/M (M-times lower compared to the input signal). The number of samples for each branch is represented in this document and figures by "k". So we have signals $Y_m(k)$, $X_m(k)$ and also weights $w_m(k)$.

After applying weights, the signal $Y_m(k)$ for m=0, ..., M−1 are upsampled by factor of M and then filter by band pass filters to put a specific m-th slice into appropriate position in frequency and provide appropriate frequency response.

In total, the analysis-synthesis (AS) filters may seek to ensure perfect or near perfect reconstruction of signal y(t) compared to x(t). This means that if we use all weights equal one ($w_m=1$ for m=0, 1, ..., M−1) then x(t)=y(t) or at least x(t)≈y(t). Depending on needs, other strategies for reconstructions may be used.

Figure 8:
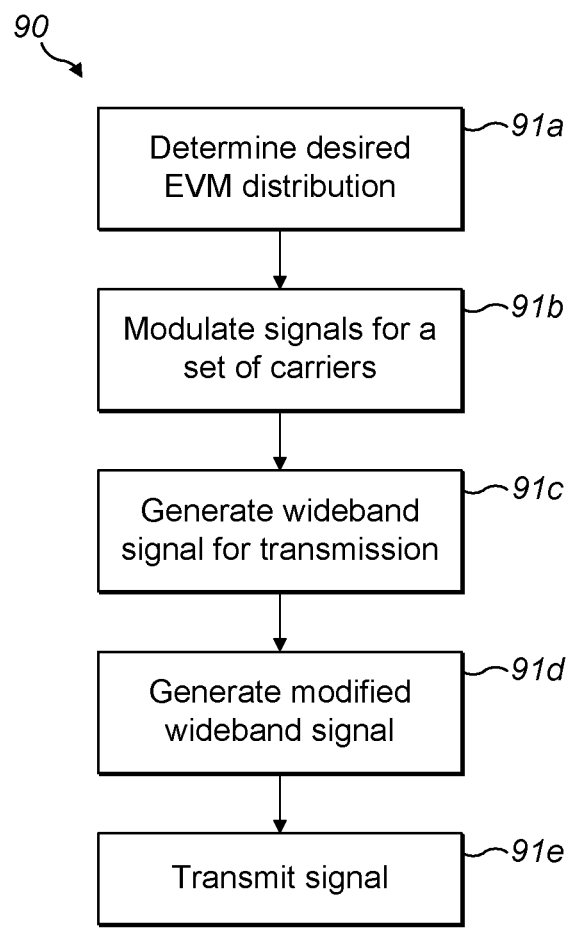
FIG. 8 is a flow chart showing an algorithm in accordance with an example embodiment.

FIG. 8 is a flow chart showing an algorithm, indicated generally by the reference numeral 90, in accordance with an example embodiment.

The algorithm 90 starts at operation 91a where a desired error vector magnitude (EVM) distribution is determined. The desired EVM distribution may, for example, distribute clipping noise amongst resource blocks of different frequency slices. Alternatively, or in addition, the desired EVM distribution may distribute clipping noise amongst resource blocks within the same frequency slice, or even outside the relevant carrier band. Examples of noise distributions amongst resource blocks (e.g. to provide a desired clipping noise distribution) are discussed further below.

At operation 91b, the signals are modulated for a set of carriers.

At operation 91c, a wideband signal for transmission (e.g. for transmission using a mobile communication system) is generated. In operation 91d, the signal for transmission is modified such that the desired EVM distribution determined in operation 91b is implemented. The operation 91d may, for example, be implemented using the algorithms 40 and 60 described above.

At operation 91e, the signal for transmission (as generated in the operation 91d) is transmitted.

Resource blocks of the transmitted signal may be modulated using one or more modulation schemes. Thus, different resource blocks may be subject to different modulation schemes. As discussed elsewhere in this document, the different modulation schemes may have different signal-to-noise ratio (SNR) requirements, which SNRs may define the extent to which noise (such as clipping noise) can be assigned to the particular resource blocks being modulated. Thus, the desired EVM for a particular resource block may be dependent, for example, on the modulation and coding scheme (MCS) for that resource block (other factors are also possible).

The desired EVM, as set in the operation 91a, may be defined in a number of ways, as discussed below.

Figure 9:
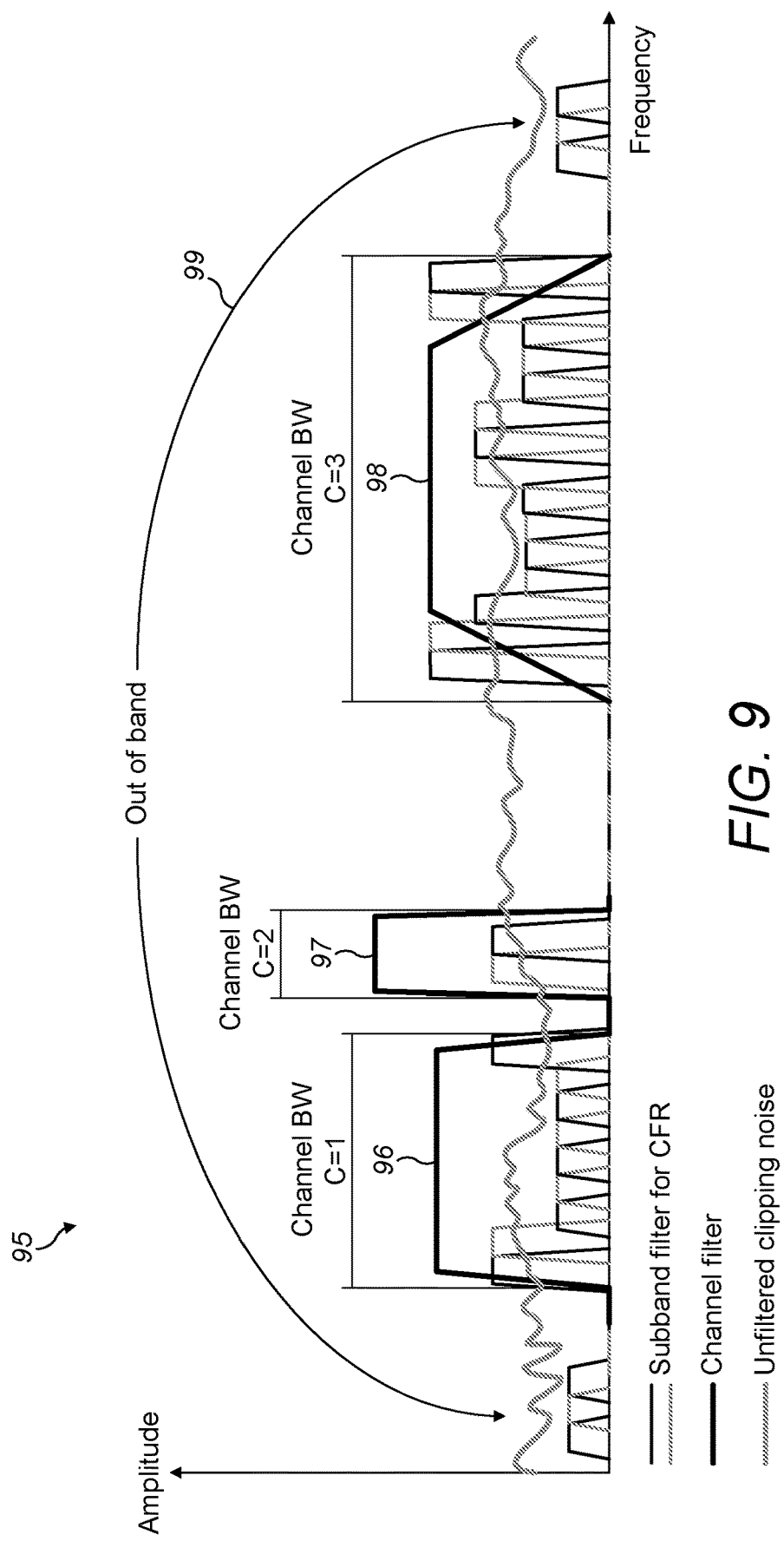
FIG. 9 is a plot showing an example wideband input signal in accordance with an example embodiment.

FIG. 9 is a plot showing an example wideband input signal, indicated generally by the reference numeral 95, in accordance with an example embodiment.

The signal 95 includes a first channel (channel BW C=1) 96, a second channel (channel BW C=2) 97 and a third channel (channel BW C=3) 98. Frequencies above and below the channels are defined as out-of-band frequencies 99. In an example embodiment, the desired EVM may be set (and implemented by the means for performing modification of the plurality of narrowband signal) to preferentially distribute said noise outside said carrier signals (i.e. at the out of band frequencies 99), such that said desired error vector magnitude (or clipping noise distribution) has a higher noise level outside some or all of said carrier signals than inside said carrier signals. By preferentially providing clipping noise outside of carrier signals, it may be possible to reduce the amount of clipping noise within a transmitted signal.

Figure 10:
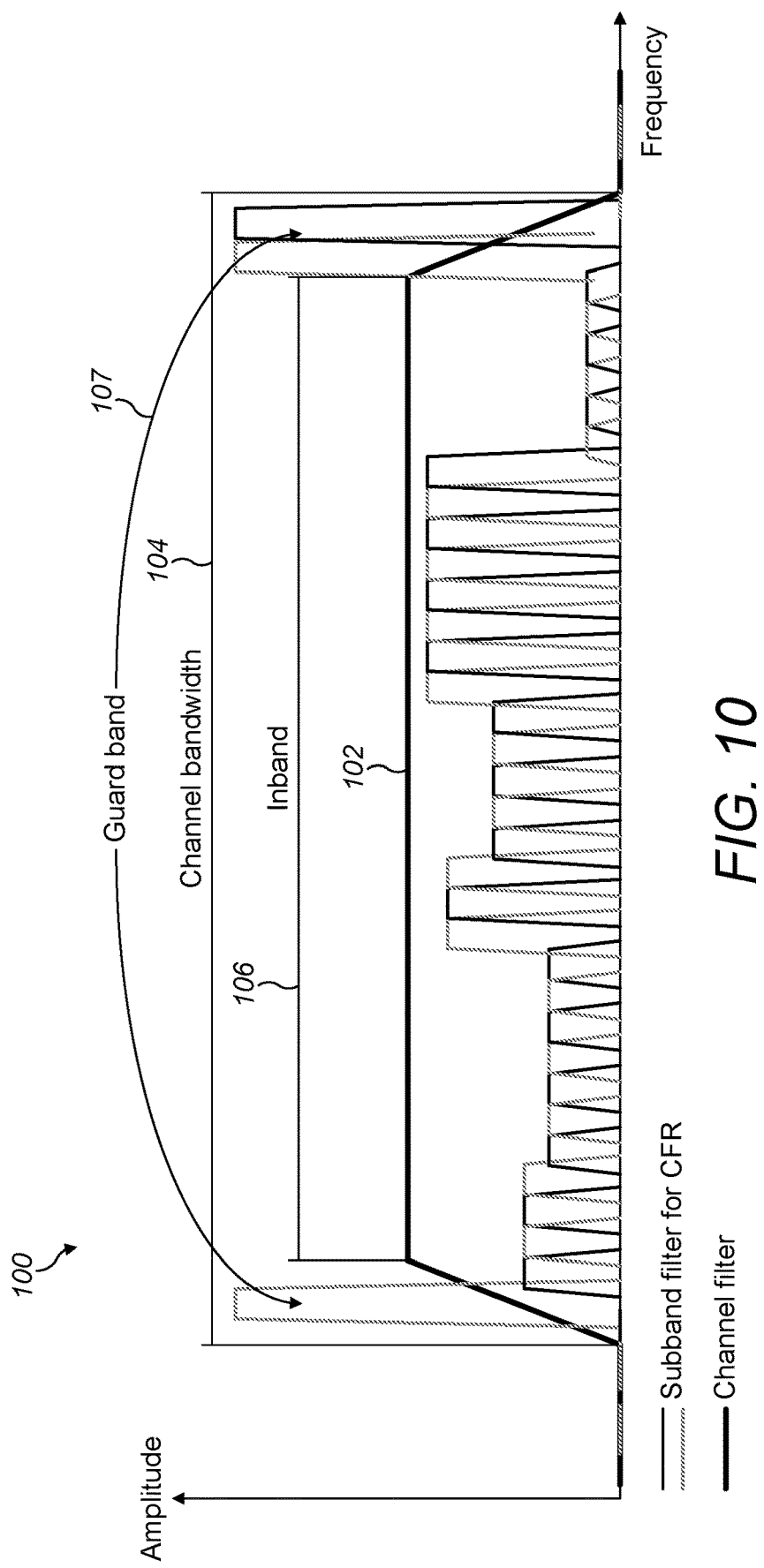
FIG. 10 is a plot of an example carrier signal in accordance with an example embodiment.

FIG. 10 is a plot of an example carrier signal, indicated generally by the reference numeral 100, in accordance with an example embodiment.

The signal 100 shows a single channel 102 (e.g. one of the channels 96, 97 and 98 described above). The signal 100 has a channel bandwidth 104 comprising an inband portion 106 and guard bands 107. In an example embodiment, the desired EVM may be set (and implemented by the means for performing modification of the plurality of narrowband signals) to preferentially distribute said noise within guard bands of carrier signals (i.e. within the guard bands 107), such that said desired error vector magnitude distribution has a higher noise level within at least some guard bands of carrier signals than within inband portions of the corresponding carrier signals.

Figure 11:
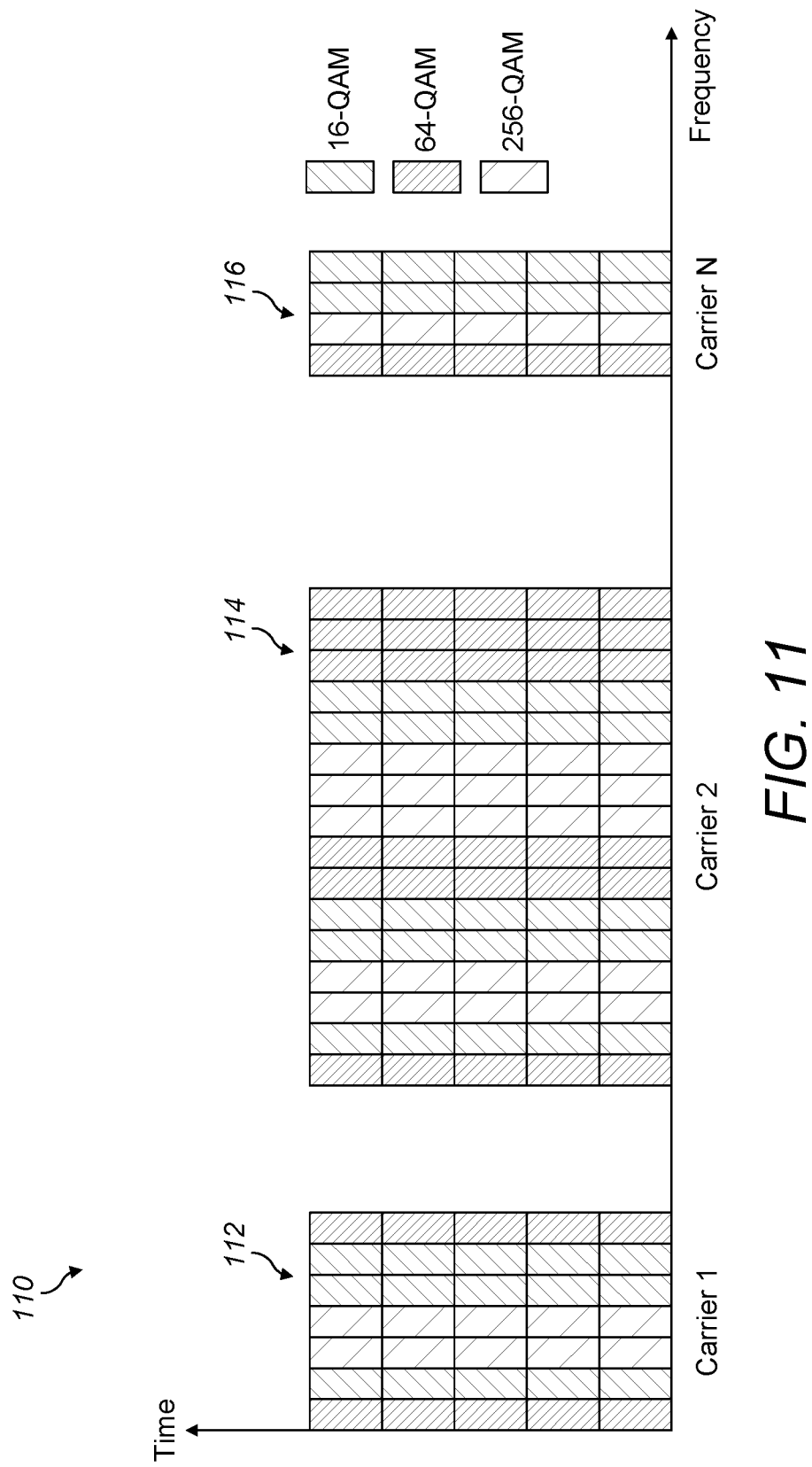
FIG. 11 is a block diagram showing an example resource block allocation within a wideband signal in accordance with an example embodiment.

FIG. 11 is a block diagram showing an example resource block allocation within a wideband signal, indicated generally by the reference numeral 110, in accordance with an example embodiment.

The signal 110 is plotted as frequency against time and comprises a first carrier 112, a second carrier 114 and a third carrier 116, with each of the carriers being provided at a different frequency range and each carrier being for transmission using a communication system. Thus, the plot 110 is similar to the plot 30 described above.

Each of the carriers 112, 114 and 116 includes a plurality of resource blocks (or resource elements), wherein each rectangle in FIG. 11 represents a resource block/element, wherein each resource block is assigned to a unique frequency and time slot of the respective carrier signal. As shown in FIG. 11, all resource blocks at a particular frequency have the same modulation scheme.

As discussed above, noise may be distributed amongst carriers, between carriers and within carriers in many different ways. For example, noise may be distributed in accordance with one of more of the schemes set out below.

Noise may be preferentially distributed amongst the carriers 112, 114 and 116, such that said desired error vector magnitude distribution has a lower noise level for some carriers that other carriers.

Alternatively, or in addition, noise may be preferentially distributed amongst resource blocks within at least some of said carriers 112, 114 and 116, such that said desired error vector magnitude distribution has a lower noise level for resource blocks within a carrier than other resource blocks within the same carrier. For example, noise may be allocated to particular frequencies of the carriers 112, 114 and 116, such that noise can be assigned dependent, at least in part, on the modulation scheme being used by the resource blocks at that frequency.

Figure 12:
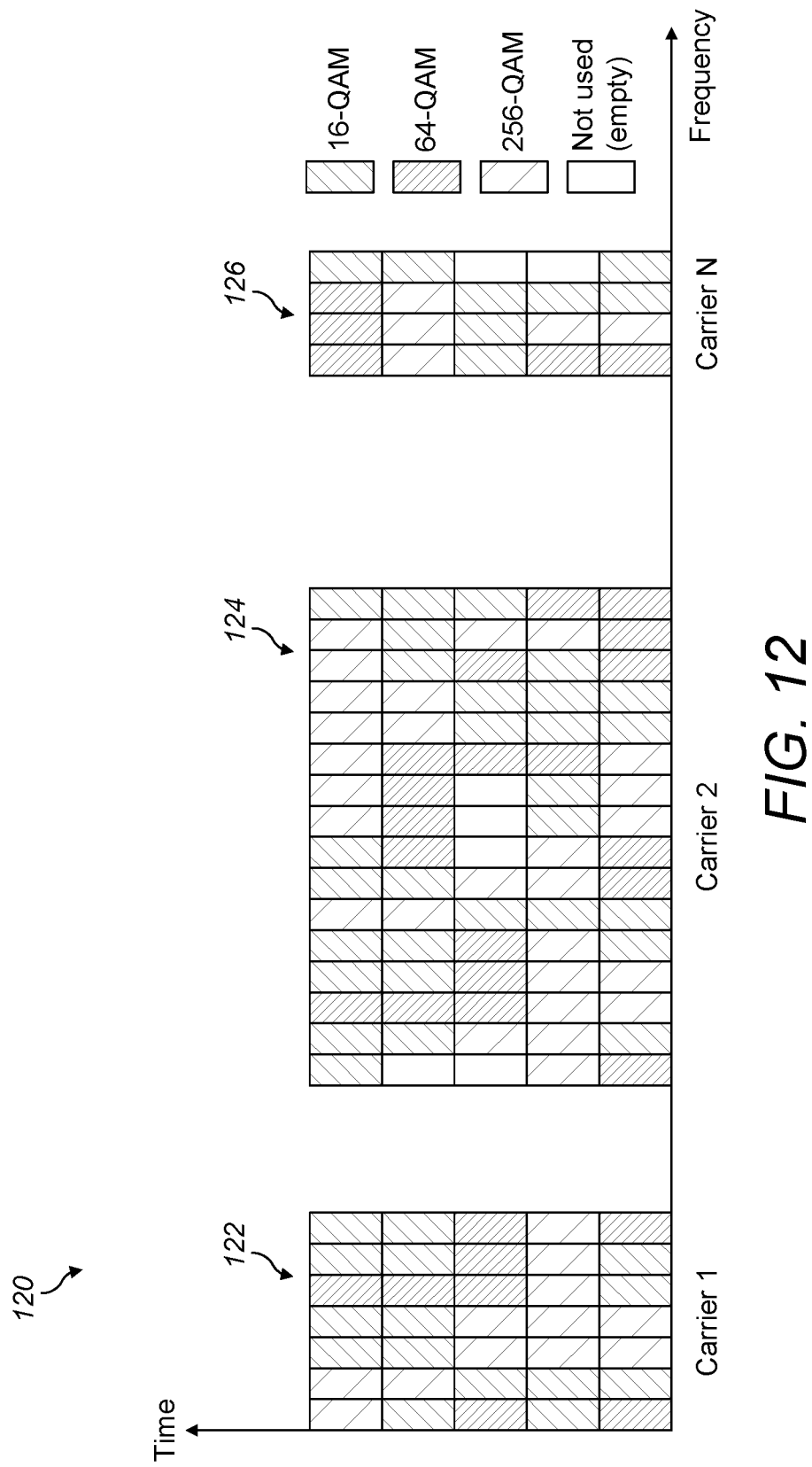
FIG. 12 is a block diagram showing an example resource block allocation within a wideband signal in accordance with an example embodiment.

FIG. 12 is a block diagram showing an example resource block allocation within a wideband signal, indicated generally by the reference numeral 120, in accordance with an example embodiment.

The signal 120 is plotted as frequency against time and comprises a first carrier 122, a second carrier 124 and a third carrier 126, with each of the carriers being provided at a different frequency range and each carrier being for transmission using a communication system. Thus, the plot 120 is similar to the plots 30 and 110 described above.

Each of the carriers 122, 124 and 126 includes a plurality of resource blocks (or resource elements), wherein each rectangle in FIG. 11 represents a resource block/element. However, in contrast with the signal 110, resource blocks assigned to a particular frequency may be subject to different modulation schemes. Moreover, some of the resource blocks in the signal 120 are unused.

As discussed above, noise may be distributed amongst carriers, between carriers and within carriers in many different ways. For example, noise may be distributed in accordance with one of more of the schemes set out below.

Noise may be preferentially distributed within resource blocks not being used for transmission of data (e.g. the unused resource blocks in the signal 120), such that said desired error vector magnitude distribution has a lower noise level within some or all resource blocks being used for transmission of data than within some or all resource blocks of corresponding frequency slices that are not being used for transmission of data.

Noise may be preferentially distributed amongst said carriers 122, 124 and 126, such that said desired error vector magnitude distribution has a lower noise level for some carriers that other carriers.

Noise may be preferentially distributed amongst resource blocks within at least some of said carriers, such that said desired error vector magnitude distribution has a lower noise level for resource blocks within a carrier than other resource blocks within the same carrier. As shown in FIG. 12, different resource blocks within a carrier may be assigned to different modulation schemes. Thus, noise may be distributed based, at least in part, on the modulation scheme allocated to a particular resource block.

In the signal 110, noise is allocated different to resource blocks in the frequency axes only. In the signal 120, noise is allocated differently to resource block in both the frequency and time axes. Thus, the signal 110 is more like static time-allocation of noise, whilst the signal 120 enables dynamic noise and time allocation of noise.

The systems described herein describe composite wideband CFR. However, the principles described herein are widely applicable and may, for example, be applied both to composite and per-carrier algorithms and can be used in wideband, dual-band and multi-band modes.

In this specification, additive CFR clipping algorithm is generally described considered, since additive clipping noise can be easily shaped to meet spectral and time requirements. However, this is not essential to all embodiments. For example, CFR algorithms can be implemented as multiplicative clippers.

Figure 13:
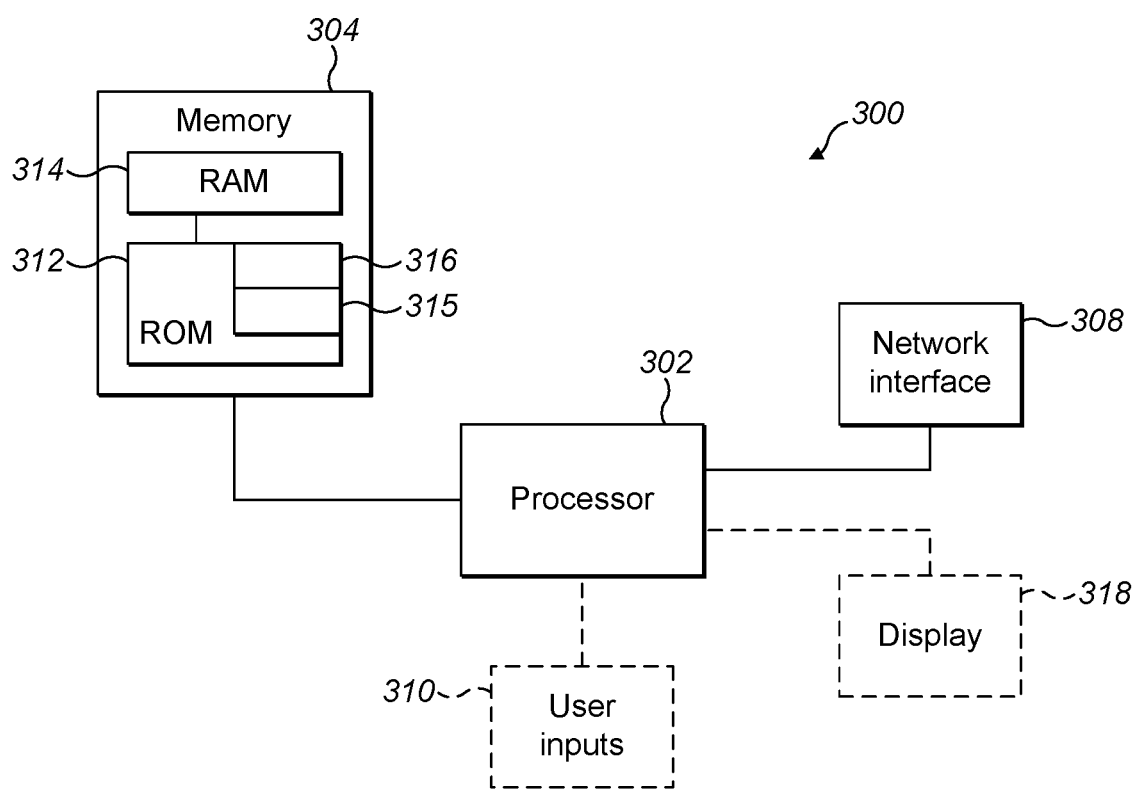
FIG. 13 is a block diagram of components of a system in accordance with an example embodiment.

For completeness, FIG. 13 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 60 and 80 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 14A:
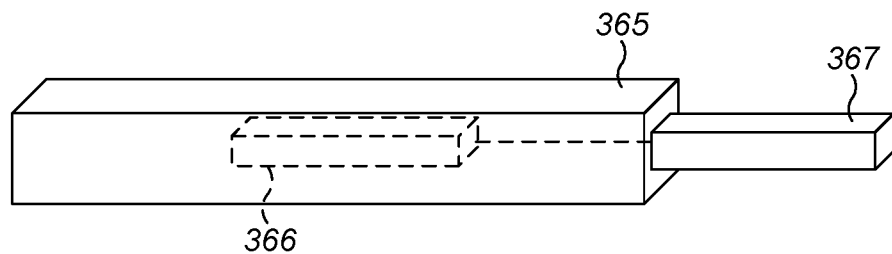
FIGS. 14A and 14B show tangible media, respectively a removable non-volatile memory unit and a Compact Disc (CD) storing computer-readable code which when run by a computer perform operations according to example embodiments.
Figure 14B:
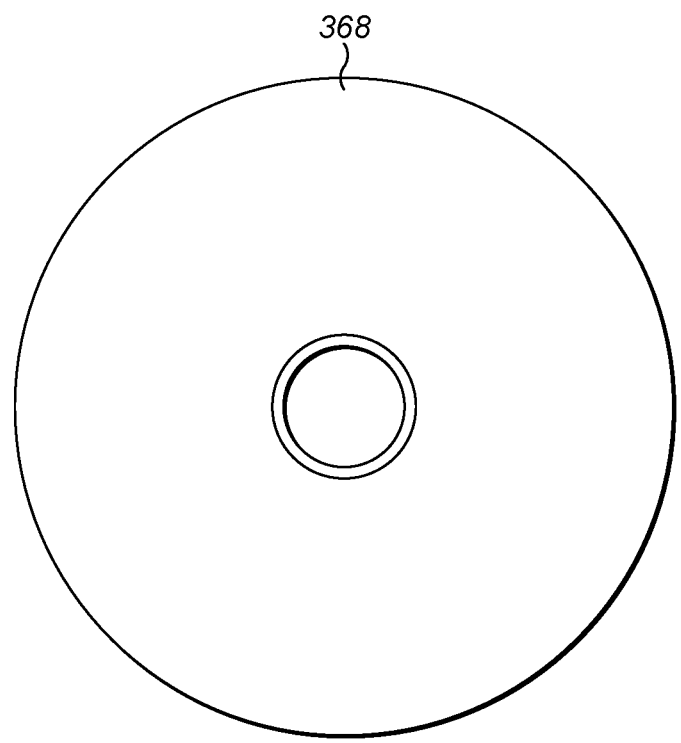

FIGS. 14A and 14B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4, 6 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising at least one processor; and at least one memory including computer program code, the at least one memory and the computer program code configured, with the at least one processor, to cause the apparatus to:
   receive a first signal, wherein the first signal comprises one or more carrier signals for transmission, each carrier signal comprising a plurality of resource blocks, wherein each resource block is assigned to a unique frequency and time slot of the respective carrier signal;
   generate a second signal by modifying said first signal, wherein the second signal is a clipping pulse signal;

convert the second signal into a plurality of narrowband signals, wherein each narrowband signal is a frequency slice of the second signal;

modify the plurality of narrowband signals to generate a plurality of modified narrowband signals, wherein said modifying is controlled based on multiplying individual ones of a plurality of filter weights with corresponding individual narrowband signals, the filter weights defining a level of noise to be added to the respective narrowband signals in accordance with at least one of a desired error vector magnitude distribution or clipping noise distribution;

combine the plurality of modified narrowband signals into a third signal; and generate a fourth signal suitable for transmission based on a combination of the first signal and third signals.

2. An apparatus as claimed in claim 1, wherein generating said second signal further comprises to modify said first signal by adding local modifications to the first signal when the amplitude of the first signal exceeds a threshold level.

3. An apparatus as claimed in claim 1 further configured to determine said desired error vector magnitude distribution or clipping noise distribution.

4. An apparatus as claimed in claim 1, wherein modification of the plurality of narrowband signals further comprises to distribute said noise outside said carrier signals, such that said desired error vector magnitude or clipping noise distribution has a higher noise level outside at least some of said carrier signals than inside said carrier signals.

5. An apparatus as claimed in claim 1, wherein modification of the plurality of narrowband signals further comprises to distribute said noise within guard bands of carrier signals, such that said desired error vector magnitude distribution has a higher noise level within at least some guard bands of carrier signals than within inband portions of the corresponding carrier signals.

6. An apparatus as claimed in claim 1, wherein modification of the plurality of narrowband signals further comprises to distribute said noise within guard bands of carrier signals, such that said clipping noise distribution has a higher noise level within at least some guard bands of carrier signals than within inband portions of the corresponding carrier signals.

7. An apparatus as claimed in claim 1, wherein modification of the plurality of narrowband signals further comprises to distribute said noise amongst said carriers, such that said desired error vector magnitude distribution or clipping noise distribution has a lower noise level for some carriers that other carriers.

8. An apparatus as claimed in claim 1, wherein modification of the plurality of narrowband signals further comprises to distribute said noise amongst resource blocks or within at least some of said carriers, such that said desired error vector magnitude distribution or clipping noise distribution has a lower noise level for resource blocks or within a carrier than other resource blocks within the same carrier.

9. An apparatus as claimed in claim 7, wherein said desired error vector magnitude distribution or clipping noise distribution has a lower noise level for at least some resource blocks or with a relatively high modulation order than other resource blocks or with a lower modulation order.

10. An apparatus as claimed in claim 1, wherein modification of the plurality of narrowband signals further comprises to distribute said noise amongst at least one of: resource blocks of different frequency slices; resource blocks of different time slices, time slots or time periods; resource blocks within the same frequency slice; and resource blocks of within the same time slice, time slot or time period.

11. An apparatus as claimed in claim 1, wherein the first signal comprises a plurality of carrier signals, each comprising a plurality of said resource blocks.

12. An apparatus as claimed in claim 1, wherein converting the second signal into a plurality of narrowband signals comprises a plurality of narrowband filters.

13. An apparatus as claimed in claim 1, wherein the resource block comprises one or more resource elements.

14. A method comprising:

receiving a first signal, wherein the first signal comprises one or more carrier signals for transmission, each carrier signal comprising a plurality of resource blocks, wherein each resource block is assigned to a unique frequency and time slot of the respective carrier signal;

generating a second signal by modifying said first signal, wherein the second signal is a clipping pulse signal;

converting the second signal into a plurality of narrowband signals, wherein each narrowband signal is a frequency slice of the second signal;

modifying the plurality of narrowband signals to generate a plurality of modified narrowband signals, wherein said modifying is controlled based on multiplying individual ones of a plurality of filter weights with corresponding individual narrowband signals, the filter weights defining a level of noise to be added to the respective narrowband signals in accordance with a desired error vector magnitude distribution or clipping noise distribution;

combining the plurality of modified narrowband signals into a third signal; and generating a fourth signal suitable for transmission based on a combination of the first signal and the third signal.

15. A method as claimed in claim 14, wherein the generating said second signal further comprises modifying said first signal by adding local modifications to the first signal when the amplitude of the first signal exceeds a threshold level.

16. A method as claimed in claim 14 further comprising: determining said desired error vector magnitude distribution or clipping noise distribution.

17. A method as claimed in claim 14, wherein the modifying of the plurality of narrowband signals further comprises preferentially distributing said noise outside said carrier signals, such that said desired error vector magnitude or clipping noise distribution has a higher noise level outside at least some of said carrier signals than inside said carrier signals.

18. A method as claimed in claim 14, wherein the resource block comprises one or more resource elements.

19. An apparatus comprising one or more means for:

receiving a first signal, wherein the first signal comprises one or more carrier signals for transmission, each carrier signal comprising a plurality of resource blocks, wherein each resource block is assigned to a unique frequency and time slot of the respective carrier signal;

generating a second signal by modifying said first signal, wherein the second signal is a clipping pulse signal;

converting the second signal into a plurality of narrowband signals, wherein each narrowband signal is a frequency slice of the second signal;

modifying the plurality of narrowband signals to generate a plurality of modified narrowband signals, wherein said modifying is controlled based on multiplying individual ones of a plurality of filter weights with corresponding individual narrowband signals, the filter weights defining a level of noise to be added to the respective narrowband signals in accordance with a desired error vector magnitude distribution or clipping noise distribution;

combining the plurality of modified narrowband signals into a third signal; and generating a fourth signal suitable for transmission based on a combination of the first signal and the third signal.

20. A non-transitory computer-readable medium comprising program instructions stored thereon for performing at least the following:

receiving a first signal, wherein the first signal comprises one or more carrier signals for transmission, each carrier signal comprising a plurality of resource blocks, wherein each resource block is assigned to a unique frequency and time slot of the respective carrier signal;

generating a second signal by modifying said first signal, wherein the second signal is a clipping pulse signal;

converting the second signal into a plurality of narrowband signals, wherein each narrowband signal is a frequency slice of the second signal; modifying the plurality of narrowband signals to generate a plurality of modified narrowband signals, wherein said modifying is controlled based on multiplying individual ones of a plurality of filter weights with corresponding individual narrowband signals, the filter weights defining a level of noise to be added to the respective narrowband signals in accordance with a desired error vector magnitude distribution or clipping noise distribution;

combining the plurality of modified narrowband signals into a third signal; and generating a fourth signal suitable for transmission based on a combination of the first signal and the third signal.

\* \* \* \* \*